US012676828B1

(12) United States Patent
Branscomb

(10) Patent No.: US 12,676,828 B1
(45) Date of Patent: Jul. 7, 2026

(54) ENCRYPTING GEOSPATIAL COORDINATES VIA INTERNET PROTOCOL ADDRESSES

(71) Applicant: Bennett Hill Branscomb, Ingleside, TX (US)

(72) Inventor: Bennett Hill Branscomb, Ingleside, TX (US)

( * ) Notice: Subject to any disclaimer, the term of this patent is extended or adjusted under 35 U.S.C. 154(b) by 0 days.

(21) Appl. No.: 19/459,623

(22) Filed: Jan. 26, 2026

Related U.S. Application Data

(60) Provisional application No. 63/761,548, filed on Feb. 21, 2025.

(51) Int. Cl.
H04L 61/00 (2022.01)
G01S 19/07 (2010.01)

(52) U.S. Cl.
CPC .............. H04L 61/35 (2013.01); G01S 19/07 (2013.01)

(58) Field of Classification Search
CPC ................................. H04L 61/35; G01S 19/07
See application file for complete search history.

(56) References Cited

U.S. PATENT DOCUMENTS

| | | | |
|---|---|---|---|
| 6,920,129 | B2 | 7/2005 | Preston et al. |
| 8,634,804 | B2 | 1/2014 | McNamara et al. |
| 8,787,928 | B2 | 7/2014 | Choi et al. |
| 8,812,027 | B2 | 8/2014 | Obermeyer et al. |
| 8,837,363 | B2 | 9/2014 | Jones et al. |
| 8,892,460 | B2 | 11/2014 | Golden et al. |
| 10,235,726 | B2 | 3/2019 | Branscomb et al. |
| 10,237,232 | B2 | 3/2019 | Jones et al. |
| 10,580,099 | B2 | 3/2020 | Branscomb et al. |
| 10,771,428 | B2 | 9/2020 | Jones et al. |
| 11,062,408 | B2 | 7/2021 | Branscomb et al. |
| 11,356,407 | B2 | 6/2022 | Jones et al. |
| 11,575,648 | B2 | 2/2023 | Jones et al. |
| 11,651,457 | B2 | 5/2023 | Branscomb et al. |
| 2002/0035432 | A1 | 3/2002 | Kubica et al. |
| 2008/0008179 | A1 | 1/2008 | Chen et al. |
| 2012/0172027 | A1 | 7/2012 | Partheesh et al. |
| 2014/0171013 | A1 | 6/2014 | Varoglu et al. |
| 2015/0031398 | A1 | 1/2015 | Rahnama |
| 2016/0323241 | A1 | 11/2016 | Jones et al. |
| 2017/0303082 | A1 * | 10/2017 | Jones .................. H04L 61/4511 |
| 2019/0215298 | A1 | 7/2019 | Jones et al. |
| 2020/0403965 | A1 | 12/2020 | Jones et al. |
| 2022/0321527 | A1 | 10/2022 | Jones et al. |
| 2023/0254665 | A1 | 8/2023 | Jones et al. |

* cited by examiner

*Primary Examiner* — Nazia Naoreen
(74) *Attorney, Agent, or Firm* — Neo IP

(57) ABSTRACT

Systems and methods for securely encoding geospatial coordinates in an internet protocol (IP) address. By using geohash polygons, the systems and methods encrypt geospatial coordinates within each of the geohash polygons using a scrambling and masking technique to ensure security. Geospatial coordinates are continuously updated using Continuously Operating Reference Stations (CORS) transmitted via a Virtual Private Network (VPN) using Long Range Wide Area Networks (LoRaWAN).

20 Claims, 6 Drawing Sheets

401

402

ENCRYPTING GEOSPATIAL COORDINATES VIA INTERNET PROTOCOL ADDRESSES

CROSS REFERENCES TO RELATED APPLICATIONS

This application is related to and claims priority from the following U.S. patents and patent applications. This application claims priority to and the benefit of U.S. Application No. 63/761,548, filed Feb. 21, 2025, which is incorporated herein by reference in its entirety.

BACKGROUND OF THE INVENTION

1. Field of the Invention

The present invention relates to encrypting geospatial coordinates. More specifically, the present invention relates to encrypting geospatial coordinates via Internet Protocol (IP) addresses.

2. Description of the Prior Art

It is generally known in the prior art to convert geospatial coordinates to an IP address.

Prior art patent documents include the following:

US Patent Pub. No. 2012/0172027 for "Use of geofence for location-based activation and control of services" by Mani Partheesh et al., filed Jan. 3, 2012, describing a geofence service that enables various remote control and automatic operations based a user's current geographic position as determined by the user's mobile device's current geographic location. The geofence service enables the user to define one or more geofences based on specific geographic locations. Such geofences may be applied against several geofence applications for remote and automatic control of devices. In one embodiment, the mobile device's volume or power control settings are adjusted based on the user's location inside or outside a geofence. In one embodiment, temperature setting of a building or house is controlled based on user's proximity to a geofence. In one embodiment, electrical appliances within a home are activated and controlled automatically based on user's current geographic location.

U.S. Pat. No. 8,787,928 for "Location-based information service method and mobile terminal therefor" by Seung Min Choi et al., filed Jan. 30, 2009, describing a location-based information service method for improving utilization of location-based information services and a mobile terminal for implementing the location-based information service method are provided. A method for providing an information service using a mobile terminal includes acquiring, at a mobile terminal, location information, determining an Internet Protocol (IP) address based on the location information, and receiving service information from a cyber space associated with a service provider that corresponds to the IP address.

US Patent Pub. No. 2008/008179 for "Geolocation-based addressing method for IPv6 address" by Liren Chen et al., filed Jul. 7, 2006, describing one feature provides a method for encoding geolocation information into a next-generation internet protocol (IP) address, such as IPv6, to facilitate distribution of geolocation information among networked devices. A request for an IP address assignment is received from a network device. The geographical location for the network device is obtained. An IP address is assigned or generated that includes the geographical location. The assigned IP address is then provided to the network device. By encoding the geolocation information of a first network device into the IP address assigned to the first network device, other network devices are able to readily obtain the geographical location of the first network device. This method propagates geolocation information for network devices as part of the IP address, thus avoiding the need for separate geolocation distribution messaging. As the network device moves, its IP address is changed to update its geographical location information.

US Patent Pub. No. 2015/0031398 for "Zone-Based Information Linking Systems and Methods" by Rahnama, filed Jul. 29, 2015, and published Jan. 29, 2015, describes a method of linking to a geo-fenced zone, the method comprising: configuring a device to operate as a document processing engine according to zone address identification rules; obtaining, by the document processing engine, a digital document; identifying, by the document processing engine, at least one zone address token in the digital document according to the zone address identification rules; resolving the at least one zone address token to a network address related to a target zone; and enabling the device to link communicatively to the target zone according to the network address.

US Patent Pub. No. 2002/0035432 for "Method and system for spatially indexing land" by Kubica, filed Jun. 8, 2001, and published May 31, 2007, describes a method of spatially indexing land by selecting a parcel (100) of land and extending its boundaries (110) to include a portion of adjacent streets (125) and alleys (122) to define a cell (150). A unique identifier is assigned to the cell as well as a reference point (170) within the cell (150). The reference point has a known location in a global referencing system. An internet address is assigned to the cell which identifies its location, such as the location of the reference point within the cell. This information and other data associated with the cell is then stored in an OX Spatial Index database and includes the street address for the cell and other relevant information such as owner, what type building if any is on the property, location of utility lines, etc. A Spatial Internet Address which includes the geographic location of the cell is assigned for each cell and this information is also stored in the index. The index thereby created can be used for various applications such as determining a user's location and locating geographically relevant information by searching the index and connecting to websites associated with the user's vicinity.

U.S. Pat. No. 6,920,129 for "Geo-spatial internet protocol addressing" by Preston, filed Nov. 30, 2000, and issued Jul. 19, 2005, describes conversion of latitude and longitude to an addressing scheme that supports current TCP/IP (Ipv4) and future addressing (Ipv6/Ipng) requirements. More specifically, it allows a decentralization of the unicast point to a device on the hosted network. Geographical Internet Protocol (geoIP) addressing will facilitate anycast routing schemes in which the nearest node has a statically assigned geoIP. Geo-routing and network management become a function of the geoIP address.

U.S. Pat. No. 8,812,027 for "Geo-fence entry and exit notification system" by Obermeyer, filed Aug. 15, 2012, and issued Aug. 19, 2014, describes a method for determining when a mobile communications device has crossed a geo-fence. The method comprises (a) providing a mobile communications device (209) equipped with an operating system and having a location detection application resident thereon, wherein the mobile communications device is in communication with a server (211) over a network (203), and wherein the server maintains a geo-fence database (213); (b) receiving, from the operating system, a notification that (i) the location of the mobile communications device has changed by an amount that exceeds a predetermined threshold, or (ii) that a period of time has passed; (c) querying the operating system for a data set comprising the general location of the mobile communications device and the corresponding location accuracy; (d) transmitting the data set to the server; and (e) receiving from the server, in response, a set of geo-fences (205) proximal to the general location.

U.S. Pat. No. 8,837,363 for "Server for updating location beacon database" by Jones, filed Sep. 6, 2011, and issued Sep. 16, 2014, describes a location beacon database and server, method of building location beacon database, and location based service using same. Wi-Fi access points are located in a target geographical area to build a reference database of locations of Wi-Fi access points. At least one vehicle is deployed including at least one scanning device having a GPS device and a Wi-Fi radio device and including a Wi-Fi antenna system. The target area is traversed in a programmatic route to reduce arterial bias. The programmatic route includes substantially all drivable streets in the target geographical area and solves an Eulerian cycle problem of a graph represented by said drivable streets. While traversing the target area, Wi-Fi identity information and GPS location information is detected. The location information is used to reverse triangulate the position of the detected Wi-Fi access point; and the position of the detected access point is recorded in a reference database.

U.S. Pat. No. 8,892,460 for "Cell-allocation in location-selective information provision systems" by Golden, et al., filed Aug. 29, 2014, and issued Nov. 18, 2014, describes system and methods for allocating cells within a virtual grid to content providers according to various priority and selection schemes are used to target content delivery to information playback devices in a geographically and/or application selective manner. The priority schemes, geographical selectivity, and application selectivity of the system and methods of the invention allow a content provider to specifically target a desired demographic with high cost efficiency and flexibility.

US Patent Pub. No. 2014/0171013 for "Monitoring a mobile device en route to destination" by Varoglu, filed Dec. 17, 2012, and published Jun. 19, 2014, describes a system, method and apparatus are disclosed for monitoring a mobile device en route to a destination. A user of a monitored device specifies geo-fence regions along a route to the destination. Entry and exit of regions triggers the sending of event notifications to a monitoring device. Event notifications may be sent if an estimated time of arrival changes due to delay. Event notifications may be sent if the monitored device deviates from a planned route by a threshold distance. Event notifications may be sent through a direct communication link between the monitored device and monitoring device or through a location-based service.

U.S. Pat. No. 8,634,804 for "Devices, systems, and methods for location based billing" by McNamara, filed Dec. 7, 2009, and issued Jan. 21, 2014, describes devices, systems and methods are disclosed which relate to billing users of a telecommunication network. A billing server is in communication with a geo-fence database. The geo-fence database contains a plurality of geo-fences. Some geo-fences are associated with a single mobile communication devices, such as a home geo-fence, work geo-fence, etc., while other geo-fences are global, such as a stadium geo-fence, toll geo-fence, etc. When a mobile communication device enters the perimeter of a geo-fence, a billing server changes the billing rate at which connections are billed to the user account or bills another user account. The mobile communication device may send a ticket code to the billing server for a reduced billing rate while within a geo-fence. If a mobile communication device enters a toll geo-fence, then the billing server charges the user account for the toll.

SUMMARY OF THE INVENTION

The present invention relates to converting and encrypting geospatial coordinates using IP addresses.

It is an object of this invention to encrypt geospatial coordinates using IP addresses to ensure secure location management.

In one embodiment, the present invention is directed to a system for encoding at least one geospatial coordinate in an internet protocol address as described herein.

In another embodiment, the present invention is directed to a method of encoding at least one geospatial coordinate in an internet protocol address as described herein.

For the purposes of this application, the term "geographic designator" refers to a physical point in space including a longitude, latitude, and/or altitude, such that the geographic designator is able to be located in the atmosphere, on the surface of the Earth, or the subsurface of the Earth.

These and other aspects of the present invention will become apparent to those skilled in the art after a reading of the following description of the preferred embodiment when considered with the drawings, as they support the claimed invention.

DETAILED DESCRIPTION

Figure 1A:
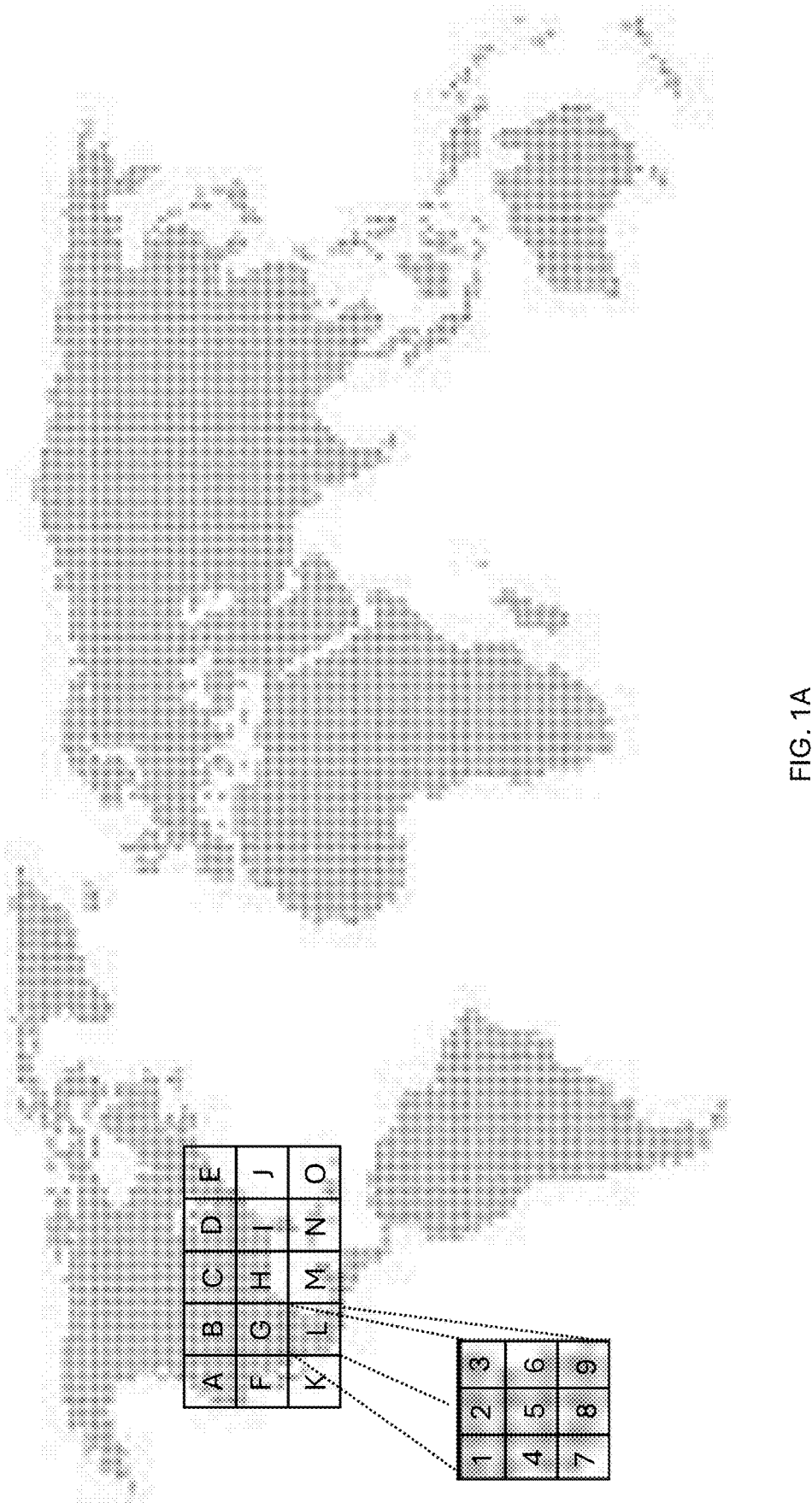
FIG. 1A illustrates a geohash polygon system according to one embodiment of the present invention.

The present invention is generally directed to secure location management via encrypted IP addresses.

In one embodiment, the present invention is directed to a system for encoding at least one geospatial coordinate in an internet protocol address as described herein.

In another embodiment, the present invention is directed to a method of encoding at least one geospatial coordinate in an internet protocol address as described herein.

In one embodiment, the present invention is directed to a method for querying geohash polygons in a Domain Name System (DNS) registry of geohash polygons, after defining each geohash polygon using at least one geographic designator, assigning an internet protocol (IP) address to each of the at least one geographic designators defining the geohash polygon, and storing the at least one geographic designator and the assigned IP address of the at least one geographic designator in the DNS of geohash polygons, wherein the IP address assigned to each of the at least one geographic designators is a unique identifier of the geographic designator. In a preferred embodiment, the IP address is an IPv6 address. This embodiment is preferred because of the enhanced functionality that is included with IPv6, including the ability to more closely define the boundaries of the geohash polygons.

None of the prior art discloses secure location management by encrypting geospatial coordinates using IP addresses.

Problematically, converting a geospatial coordinate into an IP address provides little security. Traditionally, a geohash converter takes a latitude and longitude and converts the latitude and longitude into an IP address using a process that uses a string of alphanumeric values to define a point on the surface of the Earth. The geohash converter stores each of the latitude and longitude points within a geohash boundary, making converting between geospatial coordinates and an IP address simple. Put simply, prior art systems use a database of alphanumeric values that represent points on the surface of the Earth and assign an IP address to each alphanumeric value. As such, prior art systems make a comparison between a recorded alphanumeric value and the associated IP address stored in the database to determine a location. However, a nefarious user is able to identify a location of any device within the geohash boundary with great precision by querying the database. Therefore, there exists an unmet need to increase security when converting geospatial coordinates into IP addresses to ensure only necessary devices are able to determine a location of another device.

Another problem with traditional geospatial coordinate converter systems is the lack of geospatial coordinate accuracy. Typically, a device can measure geospatial coordinates via a Global Positioning System (GPS). While the device is able to register a geospatial coordinate accurately while the device is stationary, once the device starts moving, the geospatial coordinates become less accurate due to variability in movement and precision of the GPS. Further, atmosphere and satellite clock measurements vary, causing geospatial coordinate data to become skewed. Thus, as the device moves, the accuracy of the geospatial data varies. Therefore, there exists an unmet need to increase geospatial data accuracy by continuously correcting and adjusting the geospatial data measured by the GPS of the device.

The present invention includes a secure geohash encryption system that is able to convert geospatial coordinates (i.e., at least one geographic designator) to geohash representations, encrypt the geohash representations using a unique IP address, and continuously correct location information using Continuously Operating Reference Station (CORS).

Referring now to the drawings in general, FIG. 1A illustrates a geohash polygon system according to one embodiment of the present invention. The geohash polygon system is operable to divide the surface, subsurface, and/or atmosphere of the Earth into a plurality of geohash polygons, each of the plurality of geohash polygons defined by longitudinal coordinates, latitudinal coordinates, and/or altitudinal coordinates. Each of the longitudinal coordinates, the latitudinal coordinates, and/or the altitudinal coordinates are hereinafter referred to as at least one geographic designator.

Each of the at least one geographic designator is measured using a GPS with varying resolution. Resolution, as it relates to encoding geospatial coordinates, relates to the precision of a longitudinal coordinate, latitudinal coordinate, and/or altitudinal coordinate measurement. For example, a longitudinal coordinate of −122.4194 would have a resolution of 7 because the longitudinal coordinate is measured with 7 digits. A longitudinal coordinate of −122.4193274 would have a resolution of 10 because the longitudinal coordinate is measured with 10 digits. In one embodiment, the boundary defining a perimeter of each of the plurality of geohash polygons varies based on the resolution which the GPS measures the at least one geographic designator. The resolution of a specific point on Earth is able to change based on use case. The size of the boundary of each of the plurality of geohash polygons is operable to vary based on use case. In one embodiment, an area of each of the plurality of geohash polygons is able to be as small as a single micron or as large as the surface of the Earth.

Importantly, FIG. 1A only shows a portion of the Earth divided into the plurality of geohash polygons to retain figure clarity. However, in a preferred embodiment, the entire surface of the Earth is divided into the plurality of geohash polygons. In the embodiment depicted in FIG. 1A, each of the plurality of geohash polygons are squares. However, in one embodiment, each of the plurality of geohash polygons are operable to be any shape. In one embodiment, the plurality of geohash polygons are triangles, circles, pentagons, any other polygon, and/or a combination thereof such that the entire Earth is divided and covered by at least one geohash polygon. In one embodiment, the plurality of geohash polygons are operable to be a three-dimensional shape. Each geohash area within each of the plurality of geohash polygons are labeled with a unique identifier based on the at least one geographic designator defining a perimeter of each of the plurality of geohash polygons. In the embodiment depicted in FIG. 1A, each of the geohash areas within each of the plurality of geohash polygons are labeled with an English letter. In another embodiment, each of the geohash areas within each of the plurality of geohash polygons are identified using a number, symbol, code, and/or any other unique identifier. In one embodiment, each of the plurality of geohash polygons are operable to be subdivided into at least one smaller geohash polygon, each of the at least one smaller geohash polygons identified with a unique identifier. In the embodiment depicted in FIG. 1A, each of the at least one smaller geohash polygons are identified via a numeric value. As such, each of the at least one smaller geohash polygons are able to be identified by appending the unique identifier for each of the plurality of geohash polygons with the unique identifier for the at least one smaller geohash polygon that was subdivided from the plurality of geohash polygons. For example, one of the at least one smaller geohash polygons represented by numeric values in the embodiment depicted in FIG. 1A, is identified as L1, the L representing one of the plurality of geohash polygons and the 1 representing the at least one smaller geohash polygon. The shape, size, resolution, unique identifier, and boundary of each of the plurality of geohash polygons is able to be adjusted based on use case and user needs. In one embodiment, each of the plurality of geohash polygons are operable to be continuously subdivided down to an area of about one micron. In one embodiment, the geohash polygon system is able to convert all unique identifiers into numeric values to ensure proper encoding using an IP address. Advantageously, a device can compare geohash hierarchically, such that the L pre-fix can easily discern between different geohash polygons.

Within each of the plurality of geohash polygons is an IP address assigned to a physical point in space that represents an anchor point. In one embodiment, the anchor point is the center of a geohash polygon. In another embodiment, the anchor point is not the center of the geohash polygon. Each subsequent point within the geohash polygon is assigned a unique IP address encoded with a plurality of information.

Figure 1B:
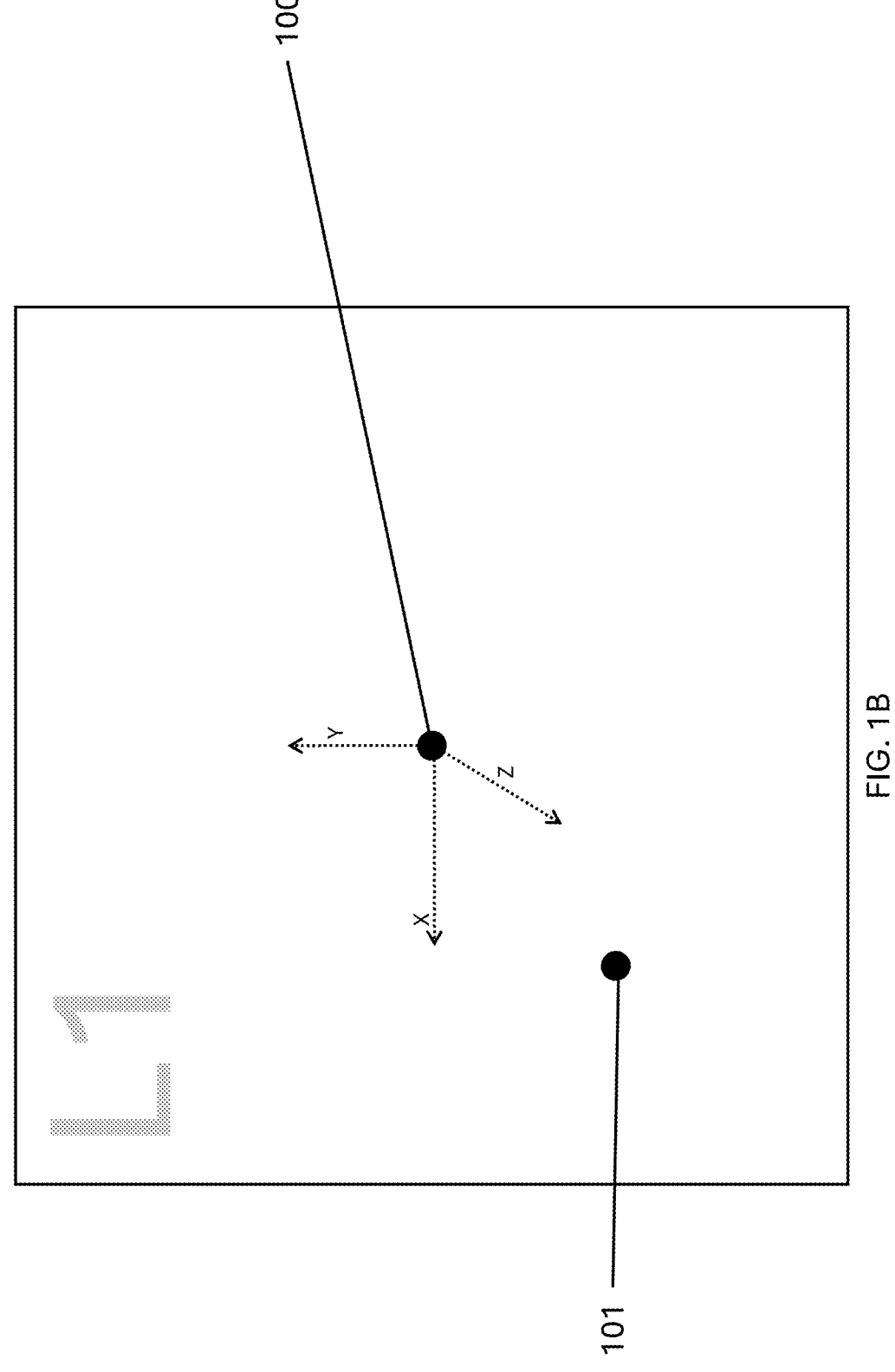
FIG. 1B illustrates an enlarged view of a geohash polygon according to one embodiment of the present invention.

FIG. 1B illustrates an enlarged view of the at least one smaller geohash polygon, labeled "L1" according to one embodiment of the present invention. In this embodiment, the at least one smaller geohash polygon "L1" is depicted in both FIGS. 1A and 1B as the subdivided geohash polygon "L". The center of the at least one smaller geohash polygon "L1" is labeled with an anchor IP address 100. The anchor IP address 100 is encoded with at least one piece of geolocation data. In one embodiment, the at least one piece of geolocation data includes the unique identifier of the at least one smaller geohash polygon. In one embodiment, the at least one piece of geolocation data includes a relative position within the at least one smaller geohash polygon from the anchor IP address 100, such as an X, Y, and/or Z coordinate. In this embodiment, the anchor IP address 100 is the center of the at least one smaller geohash polygon such that the anchor IP address 100 represents X, Y, Z coordinates of (0,0,0). The anchor IP address 100 represents a point within the at least one smaller geohash polygon that is used as a reference point for other locations within the at least one smaller geohash polygon. For example, location 101 is assigned a unique IP address. The unique IP address associated with location 101 includes geolocation data that is able to reference a position within the L1 geohash polygon relative to the anchor IP address 100. In this embodiment, location 101 includes geolocation data including non-zero X, Y, and Z coordinates. In one embodiment, location 101 includes at least one geographic designator. In one embodiment, the at least one piece of geolocation data includes resolution metadata for decoding precision. In one embodiment, the at least one piece of geolocation data includes the unique identifier of the smaller geohash polygon, the relative position within the geohash polygon, the resolution metadata, and/or the at least one geographic designator. To ensure safety, privacy, and security, there exists an unmet need to encrypt geolocation data encoded in IP addresses to ensure that malicious actors cannot determine a precise location based on IP addresses.

Figure 2:
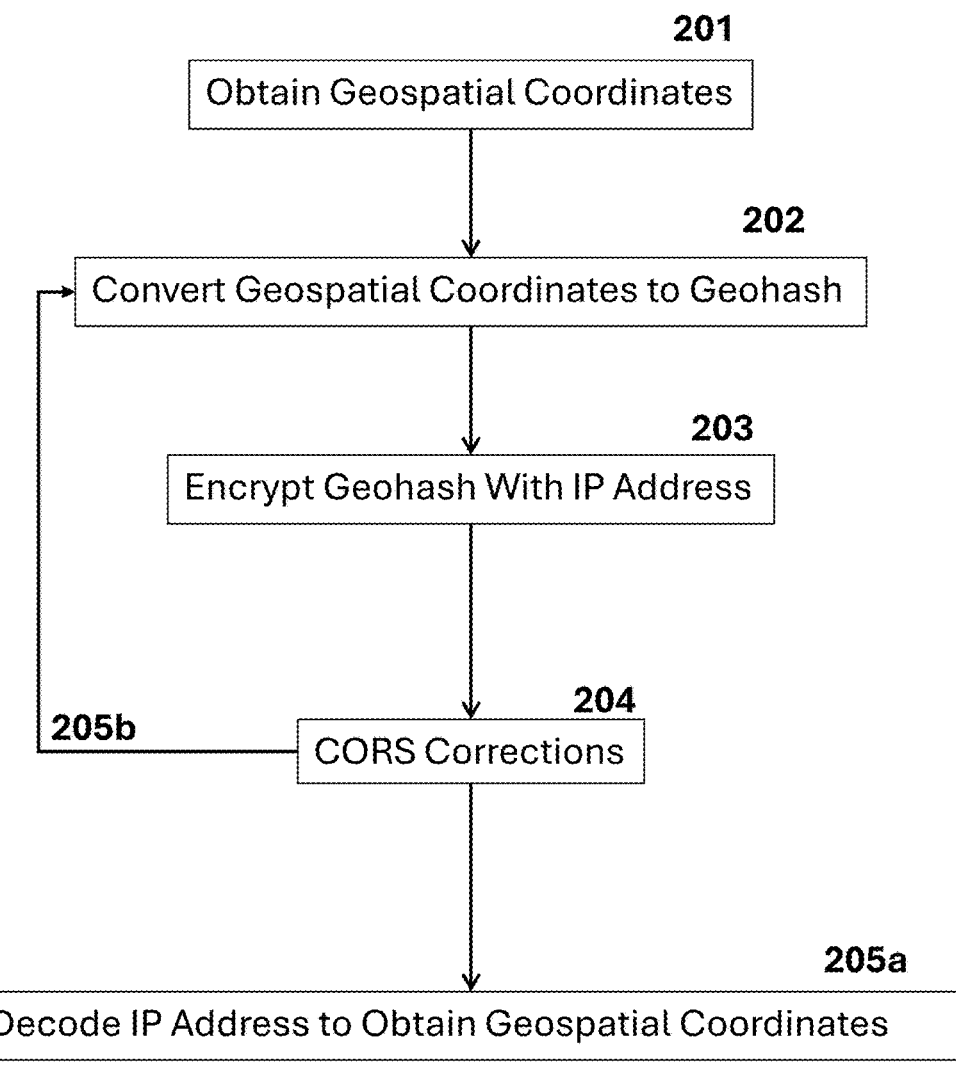
FIG. 2 illustrates encrypting geospatial coordinates using an IP address according to one embodiment of the present invention.

FIG. 2 illustrates a method for encoding at least one geographic designator via an IP address, the IP address being encrypted for a specific geohash polygon boundary via at least one computer processor. The method at step 201 includes receiving the at least one geographic designator from at least one device and/or sensor operable to measure the at least one geographic designator. In one embodiment, the at least one computer processor is operable to require a resolution of at least 7 digits.

At step 202, the method includes converting via the at least one computer processor between the received at least one geographic designator to a geohash representation. The at least one computer processor is operable to then mask the geohash representation of the at least one geographic designator according to at least one rule associated with the geohash polygon the at least one geographic designator is located within to ensure privacy and security, creating a geohash output. In one embodiment, each geohash polygon uses a unique geohash representation such that a location relative to an anchor point in one geohash polygon produces a different geohash representation than the same location relative to an anchor point in a neighboring geohash polygon (i.e., equal x, y, z coordinates in both geohash polygons). In another embodiment, each geohash polygon uses the same geohash representation such that a location relative to an anchor point in one geohash polygon produces the same geohash representation for the same location relative to an anchor point in a neighboring geohash polygon (i.e., a common geohash representation). In another embodiment, each geohash polygon is able to use a unique geohash representation or use a common geohash representation.

After the at least one computer processor creates the geohash output, the at least one computer processor creates an IP address prefix including a series of numbers based on the geohash output. The IP address prefix includes information about the geohash output, the geohash representation, and the at least one geographic designator.

The method at 203 includes the at least one computer processor generating at least one key consisting of numeric values for each geohash polygon. The at least one computer processor generates the at least one key using at least one geohash algorithm. Once the at least one computer processor generates the at least one key, the at least one computer processor appends the at least one key to the IP address prefix and scrambles the combination of the at least one key and the IP address prefix according to the at least one rule associated with the geohash polygon, creating encrypted location data. In a preferred embodiment, generating the at least one key includes using a geohash algorithm unique to each of the geohash polygons such that a unique key is created that is operable to decode encrypted IP addresses. In another embodiment, only certain devices have authority to decode encrypted IP addresses for any given geohash polygon.

Figure 3:
FIG. 3 illustrates geospatial coordinate correcting according to one embodiment of the present invention.

At 204, the method includes conducting Continuous Operating Reference Station (CORS) corrections, as depicted in FIG. 3. If the at least one computer processor detects a CORS correction, then the method at step 205b includes the at least one computer processor re-converting the geospatial coordinates to a geohash representation iteratively until the at least one computer processor no longer detects a CORS correction or detects CORS corrections less than about 1% from the original geospatial coordinates. Finally, at 205a, at least one device with authority to decode the IP address is operable to decrypt the IP address to determine the geospatial coordinates. In one embodiment, the at least one device is operable to decode the IP address using the at least one key to determine the at least one geographic designator. In one embodiment, the at least one computer processor is operable to determine the at least one geographic designator within about 1 micron (micrometer) to about 1 centimeter.

In one embodiment, the at least one computer processor communicates the at least one geographic designator via a network to an edge computer. The edge computer is operable to encrypt and decrypt the at least one geographic designator and any associated IP addresses. In yet another embodiment, the at least one geographic designator and/or the associated IP addresses are analyzed on an on-premises (i.e., within a machine and/or environment) computer. The on-premises computer is operable to encrypt and decrypt geospatial coordinates from the at least one geographic designator and the associated IP addresses.

In one embodiment, IP addresses are stored in a database and include metadata. For example, in one embodiment, an IP address includes metadata created via an artificial intelligence engine. To illustrate further, a user device is able to capture a photograph of an object while located at a geospatial coordinate. A computer processor is operable to receive the photograph and the geospatial coordinate from the user device and save the information as metadata in the database. Furter, the user device is operable to receive an input (i.e., text, audio, etc.) describing an object in the photograph. The computer processor is operable to utilize the input and use artificial intelligence to determine what the object is in the photo and save the description as metadata associated with the IP address in the database.

FIG. 3 illustrates geospatial coordinate correcting according to one embodiment of the present invention. In one embodiment, the system uses CORS corrections to continuously update geospatial data to ensure a precise location is measured. The system is able to use at least one satellite 303 to constantly communicate with a plurality of fixed GPS receivers 302. Each of the plurality of fixed GPS receivers 302 are able to collect high-precision location data to calculate and transmit geospatial corrections to the at least one satellite 303. The geospatial corrections are necessary to account for at least atmospheric and satellite clock errors. The at least one satellite 303 uses the geospatial corrections as a reference to help determine a precise location of at least one device 301. The precise location of the at least one device 301 is used to ensure accurate resolution such that geospatial data is measured with at least 7 digits of precision before being encoded with an IP address. In one embodiment, the system of the present invention is operable to use Long Range Wide Area Network (LoRaWAN). LoRaWAN uses long range radio modulation to transmit small bits of information over long distances. In one embodiment, the at least one device 301 is able to transmit geospatial coordinates using LoRaWAN to the at least one satellite 303. Advantageously, LoRaWAN connects devices to a central network server operable to store and process geospatial data and IP address data. In one embodiment, the system is operable to transmit the geospatial corrections to the at least one device 301 over a secure virtual private network (VPN). In one embodiment, the geospatial corrections include a time stamp to mitigate internet latency. In one embodiment, CORS corrections include a standard Networked Transport of RTCM via Internet Protocol (NTRIP) formats.

Figure 4:
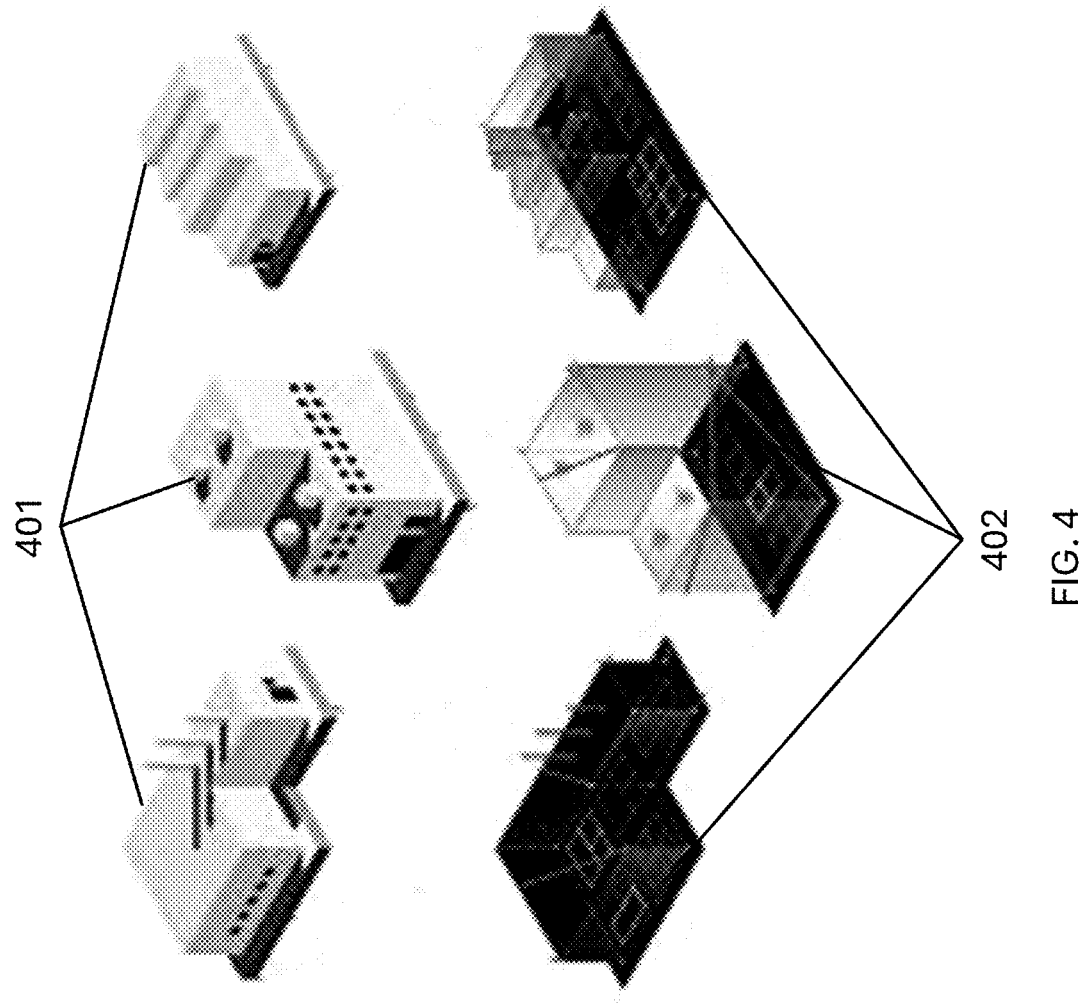
FIG. 4 illustrates a digital twin of a location according to one embodiment of the present invention.

FIG. 4 illustrates a digital twin representation 402 of at least one building 401 according to one embodiment of the present invention. Each point along and within the at least one building 401 is assigned a unique IP address encoded with geospatial data including at least one geographic designator. The system of the present invention is operable store each of the unique IP addresses that are assigned to a building in a central database. The digital twin representation 402 uses each of the unique IP addresses to re-create a digital version of the at least one building 401. Rules for creating the at least one digital twin representation are defined by a geohash boundary that the at least one building 401 is located within. The rules use Domain Name System Security Extensions (DNSSEC) to securely manage the at least one digital twin representation 402. DNSSEC authenticates responses to domain name lookups using a digital signature. The digital signature helps prevent malicious actors from manipulating the central database.

In one embodiment, the system of the present invention is operable to track physical objects in real-time. By assigning unique IP addresses to each point along the surface, subsurface, and atmosphere of Earth, the system is able to determine each point along the outer surface of an object based on a unique IP address. The system is able to track assets using real-time updates of the IP address where the object is located. In one embodiment, the system uses digital twins to manage and monitor at least one physical asset. In this embodiment, the at least one physical asset is digitalized. As the at least one physical asset moves through space, a digital representation shows the at least one physical asset moving. In one embodiment, the at least one physical asset is a vehicle. In another embodiment, the at least one physical asset is a drone. In another embodiment, the at least one physical asset is infrastructure, such as water flow beneath the surface of the Earth, traffic, and/or any other physical component of infrastructure. In one embodiment, the at least one physical asset includes a vehicle, a drone, and/or infrastructure. For example, the drone is operable to calculate intermediate waypoint by interpolating between geohashes. The drone is operable to send a current geohash representation and receive a destination geohash representation and travel to the received destination.

In one embodiment, the system of the present invention includes virtual reality elements. In this embodiment, the system receives virtual reality renderings of fictional and/or non-fictional places. Each geospatial element within the fictional and/or non-fictional virtual rendering is assigned a unique IP address. Assigning the unique IP address to the virtual renderings enhances the virtual reality experience by ensuring that a user operating a device within a virtual reality environment is correctly tracked and located within the virtual rendering for enhanced positional accuracy. In one embodiment, the fictional and/or non-fictional virtual rendering includes at least one geohash polygon. In another embodiment, the fictional and/or non-fictional virtual rendering does not include at least one geohash polygon.

In one embodiment, the system of the present invention is operable to connect the structure of geo-domains and sub-domains into IoT data sets such that IPv6 address representations of geospatial coordinates are accessible via DNS servers. In one embodiment, the DNS servers are private DNS servers. In embodiment utilizing private DNS servers, the system is operable to include sufficient space for IPv6 addresses at 7-digit resolution. As such, the system of the present invention is operable to be used for secure private drone networks, secure permission management for device access in corporate environments, management of fleets of vehicles and service logistics, measurements and management of IoT devices and a purpose of the IoT devices for farming such that the purpose of the IoT device is structured into plant polygons for spatial identification of growth problems, pest identification mapping, dynamic management of water crafts, boats, marinas, slips and logistical support, and/or any connected device.

Figure 5:
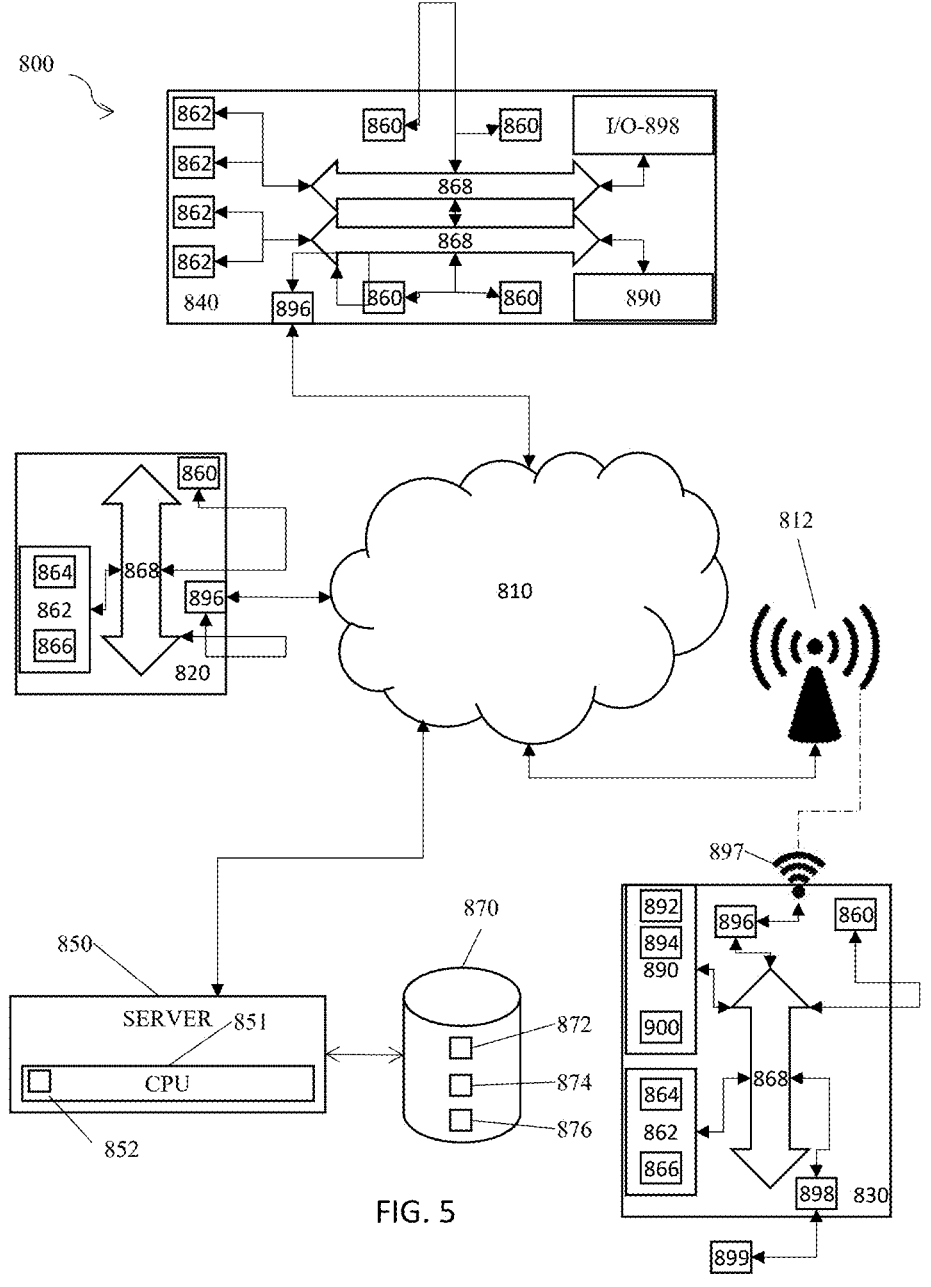
FIG. 5 illustrates a schematic diagram according to one embodiment of the present invention.

FIG. 5 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICRO-WAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that is able to perform calculations, process instructions for execution, and/or other manipulations of information.

In another implementation, shown as 840 in FIG. 5, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable to be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that is able to store the computer readable instructions and which is able to be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

It is also contemplated that the computer system 800 is operable to not include all the components shown in FIG. 5, is operable to include other components that are not explicitly shown in FIG. 5, or is operable to utilize an architecture completely different from that shown in FIG. 5. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A system for encoding a geospatial coordinate as an internet protocol (IP) address, comprising:
   at least one computer processor including a memory; and
   a server including a database;
   wherein the at least one computer processor is operable to receive at least one geospatial coordinate;
   wherein the at least one computer processor is operable to convert the at least one geospatial coordinate into a geohash;
   wherein the at least one computer processor is operable to encrypt the geohash and store the encrypted geohash as the IP address;
   wherein the at least one computer processor is operable to continuously update and correct the at least one geospatial coordinate using a stationary global positioning sensor (GPS); and
   wherein the IP address is saved in the database.

2. The system of claim 1, wherein the continuous updates and correction to the at least one geospatial coordinate includes the stationary GPS communicating geospatial data to at least one satellite.

3. The system of claim 1, wherein the IP address includes metadata created in part by artificial intelligence (AI).

4. The system of claim 3, wherein the metadata includes a photograph of an object located at the at least one geospatial coordinate.

5. The system of claim 4, wherein the metadata includes a description of the object utilizing a natural language output generated by the AI.

6. The system of claim 1, wherein a preauthorized device is operable to decrypt the IP address to determine the at least one geospatial coordinate.

7. The system of claim 1, wherein the at least one geospatial coordinate is measured with at least 7 digit resolution.

8. The system of claim 1, wherein the at least one geospatial coordinate includes latitude, longitude, and altitude.

9. A method for encoding a geospatial coordinate as an internet protocol (IP) address, comprising:
   providing at least one computer processor including a memory; and
   providing a server including a database;
   receiving at least one geospatial coordinate;

converting the at least one geospatial coordinate into a geohash;
   encrypting the geohash and storing the encrypted geohash as the IP address;
   continuously updating and correcting the at least one geospatial coordinate using a stationary global positioning sensor (GPS); and
   saving the IP address in the database.

10. The method of claim 9, further comprising the stationary GPS correcting and updating the at least one geospatial coordinate by referencing the at least one geospatial coordinate relative to a location of the stationary GPS and communicating the corrected and updated at least one geospatial coordinate to at least one satellite.

11. The method of claim 9, further comprising artificial intelligence (AI) generating metadata for the IP address.

12. The method of claim 11, wherein the metadata includes a photograph of an object located at the at least one geospatial coordinate.

13. The method of claim 12, wherein the metadata includes a description of the object utilizing a natural language output generated by the AI.

14. The method of claim 9, wherein the at least one geospatial coordinate includes latitude, longitude, and altitude.

15. The method of claim 9, wherein the at least one geospatial coordinate is measured with at least 7-digit resolution.

16. The method of claim 9, further comprising decrypting, by an authorized device, the IP address to determine the at least one geospatial coordinate.

17. A system for encoding a geospatial coordinate as an internet protocol (IP) address, comprising:
   at least one computer processor including a memory; and
   a server including a database;
   wherein the at least one computer processor is operable to receive at least one geospatial coordinate;
   wherein the at least one computer processor is operable to convert the at least one geospatial coordinate into a geohash;
   wherein the at least one computer processor is operable to encrypt the geohash and store the encrypted geohash as the IP address;
   wherein the at least one computer processor is operable to continuously update and correct the at least one geospatial coordinate using a stationary global positioning sensor (GPS);
   wherein the stationary GPS correcting and updating the at least one geospatial coordinate includes the stationary GPS referencing the at least one geospatial coordinate relative to a location of the stationary GPS and communicating the corrected and updated at least one geospatial coordinate to at least one satellite; and
   wherein the IP address is saved in the database.

18. The system of claim 17, wherein the at least one geospatial coordinate includes latitude, longitude, and altitude.

19. The system of claim 17, wherein a preauthorized device is operable to decrypt the IP address to determine the at least one geospatial coordinate.

20. The system of claim 17, wherein the IP address includes metadata created in part by artificial intelligence (AI).

* * * * *